United States Patent

Neudorfer

[11] 4,100,952
[45] Jul. 18, 1978

[54] METHOD FOR JOINING CROSSED SUPPORT MEMBERS TO EACH OTHER

[76] Inventor: Robert J. Neudorfer, P.O. Box 601, Crosset Hill Rd., Waterbury, Vt. 05676

[21] Appl. No.: 762,632

[22] Filed: Jan. 26, 1977

[51] Int. Cl.² .................. B27F 1/00; F16M 11/20
[52] U.S. Cl. .................. 144/314 B; 52/668; 144/309 L; 144/316; 156/257; 248/188.7; 403/344; 403/347
[58] Field of Search .............. 144/313, 314 R, 314 A, 144/314 B, 315, 318, 309 L, 309 R, 316; 156/257; 403/341, 346, 347; 297/445, 442; 248/539, 188.7; 52/657, 668, 667

[56] References Cited

U.S. PATENT DOCUMENTS

| 1,401,330 | 12/1921 | Foote | 248/188.7 |
|---|---|---|---|
| 1,574,963 | 3/1926 | Foote | 248/188.7 |
| 2,628,668 | 2/1953 | Basile | 297/442 |
| 3,655,156 | 4/1972 | Petrie | 248/188.7 |
| 3,748,814 | 7/1973 | Cribben | 403/347 X |

FOREIGN PATENT DOCUMENTS

| 1,214,702 | 11/1959 | France | 403/346 |
|---|---|---|---|
| 363,444 | 9/1962 | Sweden | 403/346 |
| 501,172 | 2/1939 | United Kingdom | 144/315 R |

*Primary Examiner*—Othell M. Simpson
*Assistant Examiner*—W. D. Bray
*Attorney, Agent, or Firm*—W. H. MacAllister

[57] ABSTRACT

A method for fabricating or joining crossed lengths of wood (e.g., table legs) together. Mating or facing portions of each leg are removed to about half the thickness of the leg at the point of intersection. The legs are then affixed to each other at the matching portions to form a joint therebetween having substantially flush lateral surfaces. The "V" portions (four in number) between the criss-crossed legs are filled with triangular blocks which have a thickness equal to that of the legs. A cover or face piece of wood is then placed over the criss-crossed legs and the triangular blocks.

1 Claim, 6 Drawing Figures

U.S. Patent  July 18, 1978  4,100,952
Fig. 1.
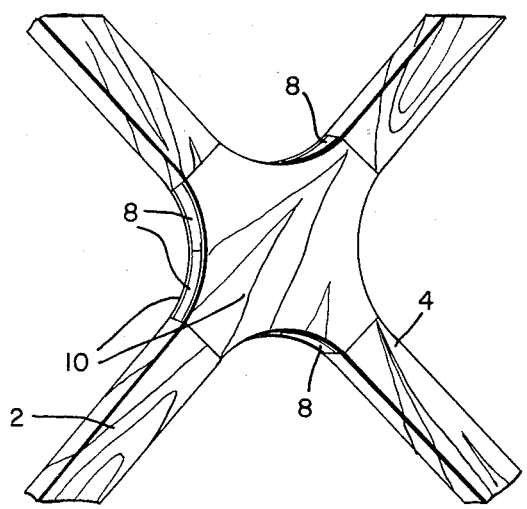
Fig. 2
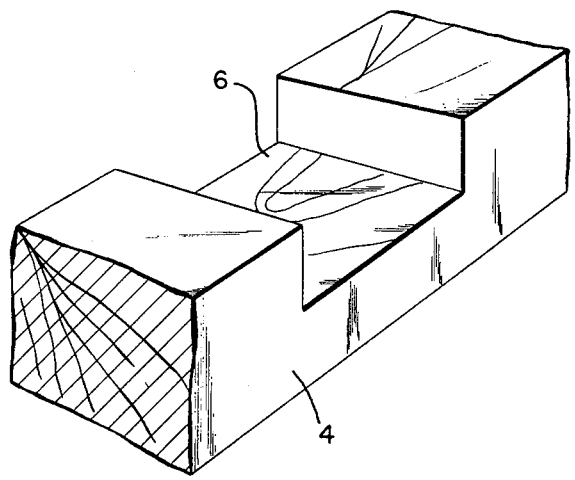
Fig. 3.
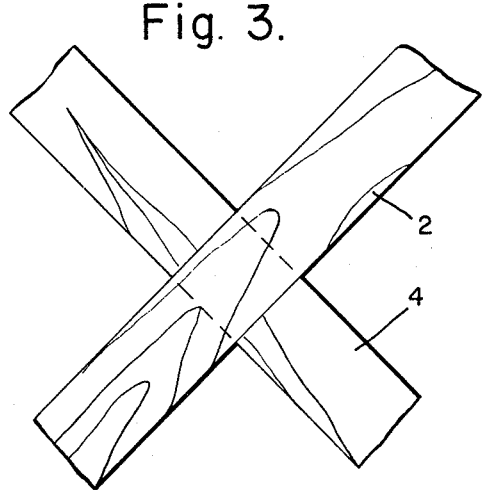
Fig. 4.
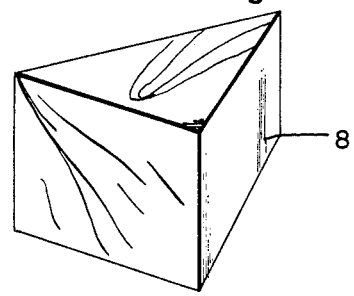
Fig. 5.
Fig. 6.
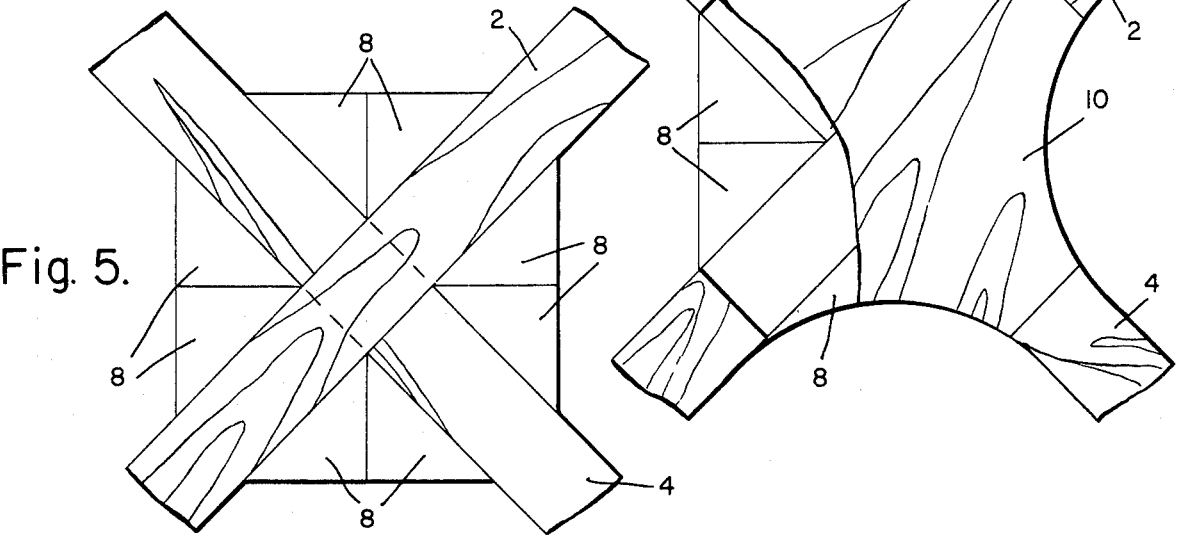

METHOD FOR JOINING CROSSED SUPPORT MEMBERS TO EACH OTHER

BACKGROUND OF THE INVENTION

Crossed table or chair legs are customarily secured to each other by means of a bolt, pin or screw passing through each leg usually at the center of the intersection of the legs. Sometimes the joint is strengthened by means of glue or adhesive applied between the contacting surfaces of the crossed legs. It is also common to remove a portion of each leg at the point of intersection so as to form matching portions of half-thickness so that the legs may then be joined by bringing the matching "notches" together resulting in the surfaces of the crossed legs lying in a common plane or being "flush". Permanence in such half-lap joints may be obtained by mechanical fasterners or adhesives as noted hereinabove.

Crossed legs or support members may also be formed by providing one leg or member as a complete and integral unit, the other leg being formed of two substantially identical members which abut the unitary leg member or either side thereof to form, in appearance at least, a pair of crossed legs. The abutting surfaces in this arrangement are usually secured to each other by means of adhesive. It has also been common to utilize a flat retainer or gusset plate member which is affixed to the "flush" or planar surfaces of the legs to reinforce the joinder thereof as shown in U.S. Pat. Nos. 1,048,566 to Miller and 3,803,794 to Luckey.

While the prior art techniques for providing crossed support members or legs for chairs and tables and the like may be satisfactory for some purposes, they nevertheless often lack the requisite strength to support massive tables or weighty objects without the use of special strengtheners (i.e., gusset plates) or other mechanical means (i.e., bolts or screws) which detract from the desired pleasing appearance of the crossed legs and still may be limited in the extent to which they reinforce such crossed leg structures.

SUMMARY OF THE INVENTION

The present invention relates to an improved method for fabricating or joining crossed support members to each other. More particularly, the method of the invention relates to the joining together of a pair of support members or legs for tables or chairs which legs cross or intersect each other in the form of an "X".

By the present invention, portions intermediate the ends of a pair of legs to be joined together are partially removed to form half-lap joint sections. The two legs are then brought together and affixed to each other at their respective half-lap joint sections, thus forming an "X". Triangularly shaped blocks are then placed in the angles or "V"-shaped portions formed by the intersection of the two legs with each other. The blocks may be approximately equal in thickness to the thickness of the legs and may be glued thereto. The lateral surfaces or those of the joint section thus formed which face in the same direction may be covered with pieces of wood glued thereto to cover the joint structure of the legs and the triangularly shaped blocks. These cover pieces may be inlaid if desired.

With the present invention an exceptionally strong joint between crossing support members may thus be formed which is also of pleasing appearance.

It is an object of the invention to provide an improved method for fabricating and joining together crossing support members.

Another object of the invention is to provide an improved method for making a strong joint between crossing support members.

Still another object of the invention is to provide an improved method for joining crossing table or chair legs.

The invention will be described in greater detail by reference to the following description taken in connection with the accompanying illustrative drawings.

BRIEF DESCRIPTION OF THE DRAWINGS

FIG. 1 is a perspective view of a pair of support members joined together in accordance with the method of the invention;

FIG. 2 is a perspective view of one support member at an initial stage in the preparation thereof according to the method of the invention;

FIG. 3 is a front elevational view of a pair of support members at a second stage in the construction thereof according to the method of the invention;

FIG. 4 is a perspective view of a triangularly-shaped member for use in forming a joint structure according to the method of the invention;

FIG. 5 is a front elevational view of a pair of support members with a plurality of triangularly-shaped members in position to form the joint structure according to the method of the invention, and FIG. 6 is a front elevational view of a pair of support members having the joint structure formed according to the method of the invention with a covering or face piece in place and shown with a portion removed so as to permit the underlying structure to be seen.

DESCRIPTION

In order to provide the crossed support members or legs 2, 4 joined according to the method of the invention as shown in FIG. 1, the first step is to remove portions of the legs at the point or areas thereof at which the legs are to cross and contact each other. Since it is desired that the surfaces of crossed legs that lie in the same plane be flush with respect to each other, half of the thickness of each leg is removed as shown in FIG. 2. The crossed joint to be formed at this step in the practice of the method of the invention is commonly called a "halved joint" and may be accomplished by any one of several methods. Parallel saw cuts to about half the thickness of the legs may be followed by waste chiseling out the intervening waste portion or the waste portion may be removed by a router. The two legs are then joined to each other by bringing the halved portion 6 of each leg into contact with each other. Thus, the legs are in crossing relationship as shown in FIG. 3 with the front and rear surfaces thereof flush with respect to each other. Permanent joinder may be achieved by means of wood glue applied to each contacting surface of the halved joint portions of the legs. The next step in the method of the invention is to fill the angles between the crossed legs 2, 4 with triangularly shaped blocks one of which is shown in FIG. 4. Either four ot eight of these blocks are employed for this purpose. Each of the four angles between the crossed legs 2, 4 is filled with either a single triangular block 8 or a pair of such blocks as shown in FIG. 5. The blocks are shaped and sized so as to fill these angles and may be of a thickness equal to that of the legs so as to have their front and rear surfaces flush or co-planar with the front and rear surfaces of the legs 2, 4, respectively. Again permanent joinder may be achieved by means of wood glue applied to all contacting surfaces of the legs 2, 4 and the blocks 8.

A final step which may be performed in the practice of the method of the invention is to "face" or cover the front and rear surfaces of the leg and block joint just accomplished as shown in FIG. 6. This face or cover portion 10 may be of wood, for example, and especially of a wood which matches that of the legs 2, 4. The face or cover 10 may be of any desired thickness such as 1/16th or an ⅛th of an inch, for example. The area of the blocks 8 and the legs 2, 4 to be covered by the face member 10 must be reduced in thickness to the extent of the thickness of the face member 10. This reduction in thickness of this area of the legs and blocks may be achieved by routing or sanding and then the face member 10 is laid in the recessed area and glued thereto. In order to provide the joint with a more pleasing appearance, it may be rounded or curved between the crossing legs 2, 4 as shown in FIGS. 1 and 6.

The crossed joint of the invention has been found to be extremely strong yet the method for providing the joint structure is straightforward and involves no costly or complex parts or steps. It should be understood that while flush or co-planar surfaces are preferable for the lateral surfaces of the legs and the triangular block members, the practice of the method of the invention is not limited thereto nor to the utilization of half-lap joints or triangular blocks of thickness equal to that of the legs.

What is claimed is:

1. The method of fabricating crossing support members comprising the steps of:
    (A) forming a half-lap joint section in each of a pair of said support members;
    (B) joining said pair of said support members to each other at said half-lap joint sections whereby said support members intersect each other;
    (C) securing triangularly-shaped blocks to said support members in the angles formed by the intersection of said support members with each other;
    (D) and applying a facing to the surfaces of said triangularly-shaped blocks and said support members which lie in a common plane with each other, said facing being inlaid in said triangularly-shaped blocks and said support members.

* * * * *